US009408200B2

(12) United States Patent
Kim et al.

(10) Patent No.: US 9,408,200 B2
(45) Date of Patent: Aug. 2, 2016

(54) METHOD FOR RECEIVING UPLINK SIGNAL, BASE STATION, METHOD FOR TRANSMITTING UPLINK SIGNAL AND USER EQUIPMENT

(71) Applicant: LG ELECTRONICS INC., Seoul (KR)

(72) Inventors: Hakseong Kim, Anyang-si (KR); Byounghoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 46 days.

(21) Appl. No.: 14/359,044

(22) PCT Filed: Nov. 19, 2012

(86) PCT No.: PCT/KR2012/009787
§ 371 (c)(1),
(2) Date: May 16, 2014

(87) PCT Pub. No.: WO2013/073917
PCT Pub. Date: May 23, 2013

(65) Prior Publication Data
US 2014/0301345 A1    Oct. 9, 2014

Related U.S. Application Data

(60) Provisional application No. 61/561,232, filed on Nov. 17, 2011.

(51) Int. Cl.
*H04L 5/00* (2006.01)
*H04W 72/04* (2009.01)
(Continued)

(52) U.S. Cl.
CPC ......... *H04W 72/0413* (2013.01); *H04L 1/1671* (2013.01); *H04L 5/0053* (2013.01);
(Continued)

(58) Field of Classification Search
CPC .................................................... H04W 72/04
USPC .................................................. 370/328–329
See application file for complete search history.

(56) References Cited

U.S. PATENT DOCUMENTS

2009/0046645 A1* 2/2009 Bertrand ............. H04J 11/0069
370/329
2011/0158191 A1* 6/2011 Zhang ..................... H04L 5/003
370/329
(Continued)

FOREIGN PATENT DOCUMENTS

KR    10-2011-0010538    2/2011
KR    10-2011-0043493    4/2011
(Continued)

OTHER PUBLICATIONS

Motorola, "R1-102141: OCC and Uplink DM-RS for LTE-A," Agenda: 6.5.1, Document for Discussion: 3GPP RAN WG1 #60bis, Apr. 2010, 8 pages.
(Continued)

*Primary Examiner* — Charles C Jiang
*Assistant Examiner* — Kyaw Z Soe
(74) *Attorney, Agent, or Firm* — Lee, Hong, Degerman, Kang & Walmey; Jonathan Kang; Michael Monaco

(57) ABSTRACT

A predetermined number of cyclic shift values are defined for a demodulation of uplink data. An available portion of the cyclic shift values from among the cyclic shift values is transmitted to user equipment. Control information for uplink data is transmitted to the user equipment via a physical control channel. The control information includes information indicating one cyclic shift value for generating a reference signal from among the portion of the cyclic shift values. The user equipment transmits the uplink data based on the control information and a reference signal for a demodulation of the uplink data.

17 Claims, 8 Drawing Sheets

(51) Int. Cl.
  *H04L 27/26* (2006.01)
  *H04L 1/16* (2006.01)
  *H04J 13/00* (2011.01)
  *H04L 1/18* (2006.01)

(52) U.S. Cl.
  CPC ......... *H04L27/2613* (2013.01); *H04J 13/0062* (2013.01); *H04L 1/1812* (2013.01); *H04L 5/001* (2013.01); *H04L 5/0048* (2013.01)

(56) References Cited

U.S. PATENT DOCUMENTS

2011/0268028 A1* 11/2011 Stern-Berkowitz . H04L 27/2613
 370/328
2012/0008556 A1* 1/2012 Noh ...................... H04L 1/1893
 370/328
2013/0094449 A1* 4/2013 Takeda .................. H04L 1/1854
 370/329

FOREIGN PATENT DOCUMENTS

KR 10-2011-0074747 7/2011
KR 10-2011-0084964 7/2011

OTHER PUBLICATIONS

Motorola, "R1-094855: UL DM RS for LTE-A," Agenda: 7.4.1, Document for Discussion/Decision: 3GPP RAN WG1 #59, Nov. 2009, 6 pages.
PCT International Application No. PCT/KR2012/009787, Written Opinion of the International Searching Authority dated Mar. 27, 2013, 18 pages.

* cited by examiner

METHOD FOR RECEIVING UPLINK SIGNAL, BASE STATION, METHOD FOR TRANSMITTING UPLINK SIGNAL AND USER EQUIPMENT

CROSS-REFERENCE TO RELATED APPLICATIONS

This application is the National Stage filing under 35 U.S.C. 371 of International Application No. PCT/KR2012/009787, filed on Nov. 19, 2012, which claims the benefit of U.S. Provisional Application No. 61/561,232, filed on Nov. 17, 2011, the contents of which are hereby incorporated by reference herein in their entirety.

TECHNICAL FIELD

The present invention relates to a wireless communication system. Specifically, the present invention relates to a method and apparatus for transmitting an uplink signal and a method and apparatus for receiving an uplink signal.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed. In addition, a communication environment has evolved into increasing density of nodes accessible by a user at the periphery of the nodes. A node refers to a fixed point capable of transmitting/receiving a radio signal to/from a user equipment through one or more antennas. A communication system including high-density nodes may provide a better communication service to the user through cooperation between the nodes.

Such a multi-node cooperative communication scheme in which a plurality of nodes performs communication with the UE using the same time-frequency resource has much better data throughput than a conventional communication scheme in which the nodes perform communication with the UE without any cooperation by operating as independent eNBs.

A multi-node system performs cooperative communication using a plurality of nodes, each node operating as an eNB, an access point, an antenna, an antenna group, a radio remote header (RRH), or a radio remote unit (RRU). Unlike a conventional centralized antenna system in which antennas converge upon an eNB, the nodes are typically separated from each other by a predetermined interval or more in the multi-node system. The nodes may be managed by one or more eNBs or eNB controllers for controlling the operation thereof or scheduling data transmission/reception therethrough. Each node is connected to the eNB or eNB controller for managing the node through a cable or a dedicated line.

Such a multi-node system may be regarded as a type of MIMO system in that distributed nodes are capable of communicating with a single or multiple UEs by simultaneously transmitting/receiving different streams. However, since the multi-node system transmits signals using nodes distributed at various locations, a transmission region which should be covered by each antenna decreases in comparison with antennas included in the conventional centralized antenna system. Accordingly, compared with a conventional system implementing MIMO technology in the centralized antenna system, a transmit power needed when each antenna transmits a signal may be reduced in the multi-node system. In addition, since the transmission distance between an antenna and a UE is shortened, path loss is reduced and high-speed data transmission is achieved. Therefore, transmission capacity and power efficiency of a cellular system can be enhanced and relatively uniform quality of communication performance can be satisfied irrespective of the locations of UEs in a cell. Furthermore, in the multi-node system, since an eNB(s) or eNB controller(s) connected to multiple nodes performs cooperative data transmission/reception, signal loss generated in a transmission process is reduced. In addition, when nodes distant from each other by a predetermined distance or more perform cooperative communication with the UE, correlation and interference between antennas are reduced. Hence, according to the multi-node cooperative communication scheme, a high signal to interference-plus-noise ratio (SINR) can be achieved.

Due to such advantages of the multi-node system, in the next-generation mobile communication system, the multi-node system has emerged as a new basis of cellular communication through combination with or by replacing conventional centralized antenna systems in order to reduce additional installation costs of an eNB and maintenance costs of a backhaul network and simultaneously to expand service coverage and enhance channel capacity and SINR.

DETAILED DESCRIPTION OF THE INVENTION

Technical Problems

Due to introduction of new radio communication technology, the number of user equipments (UEs) to which an eNB should provide a service in a prescribed resource region increases and the amount of data and control information that the BS should receive/transmit from/to the UEs increases. Since the amount of resources available to the BS for communication with the UE(s) is finite, a new method in which the BS efficiently receives/transmits uplink/downlink data and/or uplink/downlink control information using the finite radio resources is needed.

Accordingly, the present invention provides a method and apparatus for efficiently transmitting/receiving an uplink/downlink signal.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method for receiving an uplink signal by a base station, the method including transmitting information indicating partial cyclic shift values usable by a user equipment among a predetermined number of cyclic shift values; transmitting control information for uplink data to the user equipment through a physical control channel; and receiving the uplink data according to the control information and receiving a reference signal for demodulation of the uplink data, wherein the control information includes information indicating one cyclic shift value for generating the reference signal among the partial cyclic shift values.

In another aspect of the present invention, provided herein is a base station for receiving an uplink signal, the base station including a radio frequency (RF) unit configured to transmit/receive a signal; and a processor configured to control the RF unit, wherein the processor controls the RF unit to transmit information indicating partial cyclic shift values usable by a user equipment among a predetermined number of cyclic shift values, controls the RF unit to transmit control information for uplink data to the user equipment through a physical control channel, and controls the RF unit to receive the uplink data according to the control information and receive a reference signal for demodulation of the uplink data, and wherein the control information includes information indicating one cyclic shift value for generating the reference signal among the partial cyclic shift values.

In another aspect of the present invention, provided herein is a method for transmitting an uplink signal by a user equipment, the method including receiving information indicating partial cyclic shift values usable by the user equipment among a predetermined number of cyclic shift values; receiving control information for uplink data through a physical control channel; and transmitting the uplink data according to the control information and transmitting a reference signal for demodulation of the uplink data, wherein the control information includes information indicating one cyclic shift value for generating the reference signal among the partial cyclic shift values.

In another aspect of the present invention, provided herein is a, user equipment for transmitting an uplink signal, the user equipment including a radio frequency (RF) unit configured to transmit/receive a signal; and a processor configured to control the RF unit, wherein the processor controls the RF unit to receive information indicating partial cyclic shift values usable by the user equipment among a predetermined number of cyclic shift values, controls the RF unit to receive control information for uplink data through a physical control channel, and controls the RF unit to transmit the uplink data according to the control information and transmit a reference signal for demodulation of the uplink data, and wherein the control information includes information indicating one cyclic shift value for generating the reference signal among the partial cyclic shift values.

In each aspect of the present invention, the information indicating the partial cyclic shift values may include information indicating a plurality of parameter sets, each set including one or more cyclic shift values among the predetermined number of cyclic shift values. The plural parameter sets may be used in different time resources.

In each aspect of the present invention, the one cyclic shift value may be included in a parameter set corresponding to a time resource in which the reference signal is received among the plural parameter sets.

In each aspect of the present invention, information indicating a mapping relationship between the plural parameter sets and the time resources may be transmitted to the user equipment.

In each aspect of the present invention, the partial cyclic shift values may be differently configured from cyclic shift values used by a neighboring base station in the same time resource.

The technical objects that can be achieved through the present invention are not limited to what has been particularly described hereinabove and other technical objects not described herein will be more clearly understood by persons skilled in the art from the following detailed description.

Advantageous Effects

According to the present invention, when a cell transmitting a downlink signal is different from a cell receiving an uplink signal, the risk of collision between PUCCH resources can be prevented.

According to the present invention, radio resources can be prevented from colliding with each other when a user equipment receives a downlink signal from a plurality of cells or transmits an uplink signal to the plurality of cells.

According to the present invention, efficiency of use of uplink/downlink resources can be enhanced.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
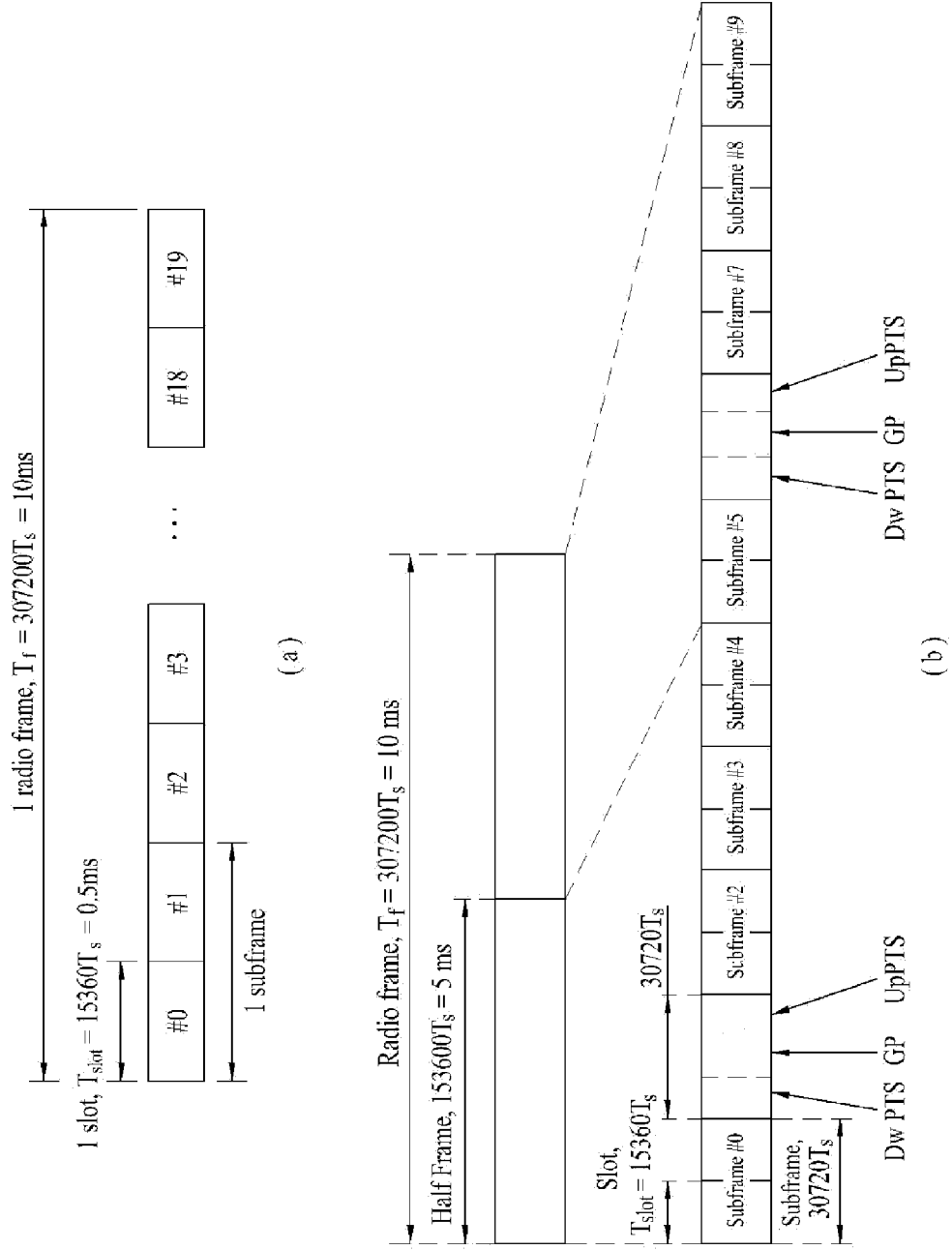
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a base station (BS) generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Hereinafter, a BS is referred to as an eNB.

In the present invention, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, a node may not be an eNB. For example, a radio remote head (RRH) or a radio remote unit (RRU) may be a node. The RRH or RRU generally has a lower power level than a power level of an eNB. Since the RRH or RRU (hereinafter, an RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. Unlike a conventional centralized antenna system (CAS) (i.e. a single-node system) including antennas which converge upon an eNB and are controlled by one eNB controller, a multi-node system includes a plurality of nodes separated from one another by a predetermined distance or more. The plural nodes may be managed by one or more eNBs or eNB controllers for controlling operation thereof or scheduling data transmission/reception therethrough. Each node may be connected to an eNB or eNB controller for managing the node through a cable or a dedicated line. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-node system of the present invention, which will be described below, one or more eNBs or eNB controllers, connected to a plurality of nodes, may control the plural nodes to simultaneously transmit or receive signals to or from a UE through some or all of the plural nodes. Although there is a difference between multi-node systems according to the nature of each node and implementation form of each node, the multi-node systems are different from single-node systems (e.g. a CAS, a conventional MIMO system, a conventional relay system, a conventional repeater system, etc.), in that plural nodes participate in providing a communication service to a UE on a predetermined time-frequency resource. Accordingly, embodiments of the present invention regarding a method for performing cooperative data transmission using some or all of plural nodes may be applied to various types of multi-node systems. For example, while a node generally refers to an antenna group separated by a predetermined interval or more from another node, the embodiments of the present invention, which will be described later, may be applied even when a node means an arbitrary antenna group irrespective of how far the node is separated from another node. For example, when an eNB includes a cross polarized (X-pole) antenna, the embodiments of the present invention are applicable under the assumption that the eNB controls a node including a horizontally polarized (H-pole) antenna and a node including a vertically polarized (V-pole) antenna.

A communication scheme capable of transmitting/receiving a signal through a plurality of transmission (TX)/reception (RX) nodes, transmitting/receiving a signal through at least one node selected from among a plurality of TX/RX nodes, or differentiating a node transmitting a downlink signal from a node receiving an uplink signal is referred to as multi-eNB MIMO or coordinated multi-point TX/RX (CoMP). A coordinated transmission scheme of such coordinated communication between nodes may be classified largely into joint processing (JP) and scheduling coordination (CB). The JP scheme may further be divided into joint transmission (JT) and dynamic point selection (DPS) and the CB scheme may further be divided into coordinated scheduling (CS) and coordinated beamforming (CB). DPS may also be called dynamic cell selection (DCS). When JP is performed compared with other communication schemes among coordination communication schemes between nodes, a wider variety of communication environments may be formed. JT of the JP scheme is a communication scheme for transmitting the same stream to a UE from a plurality of nodes. The UE restores the stream by combining signals received from the plural nodes. JT can improve reliability of signal transmission using transmit diversity because the same stream is transmitted by plural nodes. DPS of the JP scheme is a communication scheme for transmitting/receiving a signal through one node selected according to a specific rule from among a plurality of nodes. In DPS, since a node having a good channel state with a UE will typically be selected as a communication node, reliability of signal transmission can be improved.

Meanwhile, in the present invention, a cell refers to a prescribed geographical area to which one or more nodes provide a communication service. Accordingly, in the present invention, communicating with a specific cell may mean communicating with an eNB or a node which provides a communication service to the specific cell. In addition, a downlink/uplink signal of a specific cell refers to a downlink/uplink signal from/to an eNB or a node which provides a communication service to the specific cell. Furthermore, channel status/quality of a specific cell refers to channel status/quality of a channel or communication link formed between an eNB or node which provides a communication service to the specific cell and a UE. In a 3GPP LTE-A based system, the UE may measure a downlink channel state from a specific node using a channel state information-reference signal(s) (CSI-RS(s)) transmitted on a CSI-RS resource allocated to the specific node by an antenna port(s) of the specific node. Generally, neighboring nodes transmit corresponding CSI-RSs on orthogonal CSI-RS resources. When CSI-RS resources are orthogonal, this mean that at least one of CSI-RS resource configuration which specify symbols and sub-carriers carrying the CSI-RSs, subframe configuration which specify subframes, to which CSI-RSs are allocated, by using subframe offset, transmission period and etc., and/or CSI-RS sequence is different from each other.

Hereinafter, cells or points participating in multi-node communication will be referred to as a CoMP set. In the case of CoMP, since a plurality of points may participate in DL transmission to one UE CoMP, a UE configured to operate in CoMP may receive a plurality of CSI-RS configurations to measure a DL channel state of each cell of a CoMP set. The UE may measure CSI for each of the plural CSI-RS configurations and transmit the CSI and each of the plural points may detect CSI associated with a CSI-RS configuration transmitted thereby.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH) and a physical uplink shared channel (PUSCH) refer to a set of time-frequency resources or REs carrying uplink control information (UCI) and a set of time-frequency resources or REs uplink data, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH transmission of a UE is conceptually identical to UCI/uplink data/random access signal transmission on PUSCH/PUCCH, respectively. In addition, PDCCH/PCFICH/PHICH/PDSCH transmission of an eNB is conceptually identical to downlink data/DCI transmission on PDCCH/PCFICH/PHICH/PDSCH, respectively.

FIG. 1 illustrates the structure of a radio frame used in a wireless communication system. Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE(-A) radio frame is 10 ms ($307{,}200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15\ \text{kHz})$. Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
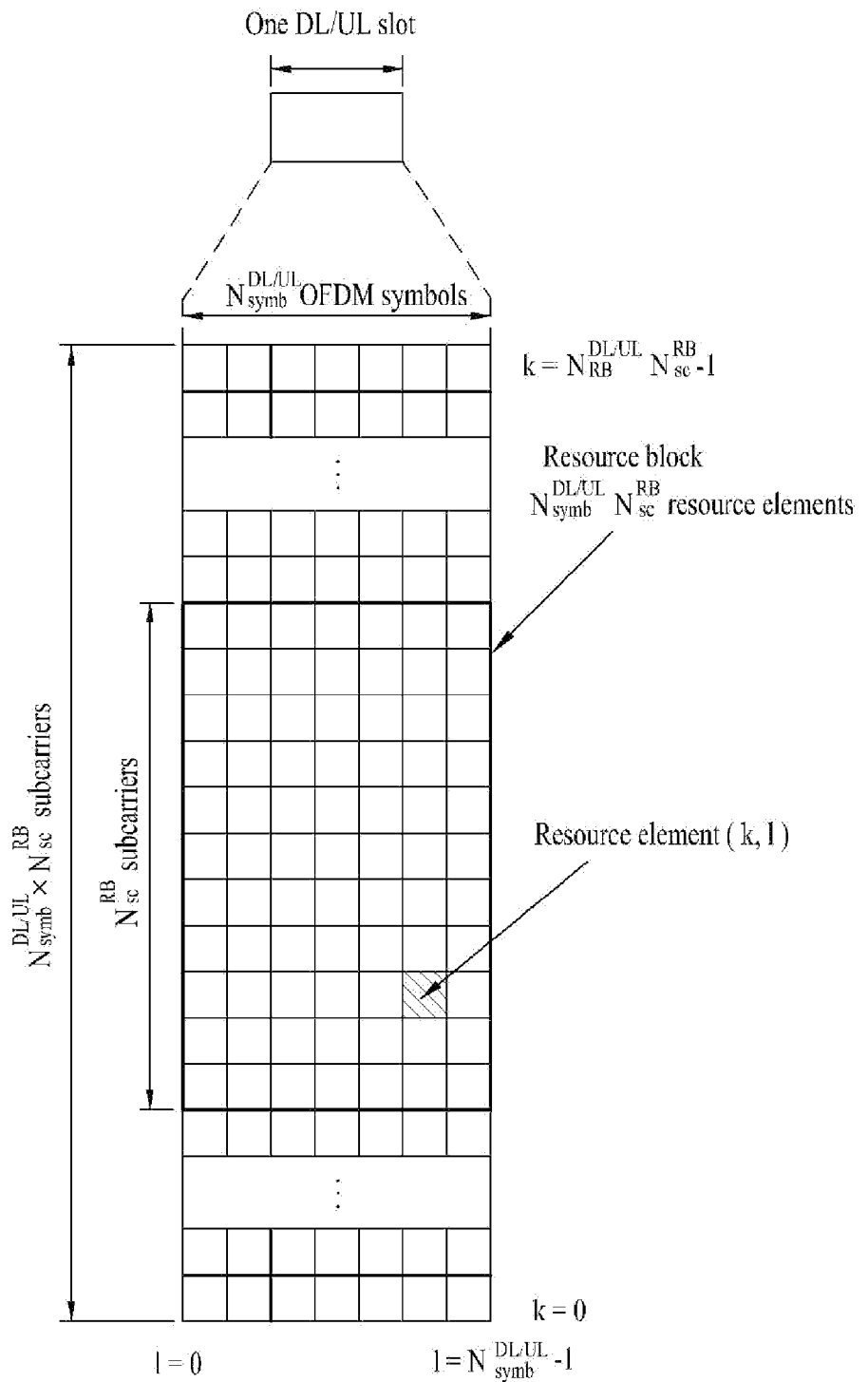
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE(-A) system. One resource grid is defined per antenna port.

A slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of resource blocks (RBs) in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to as a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and/is an index ranging from 0 to $N^{DL/UL}_{symb}-1$ in the time domain.

In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
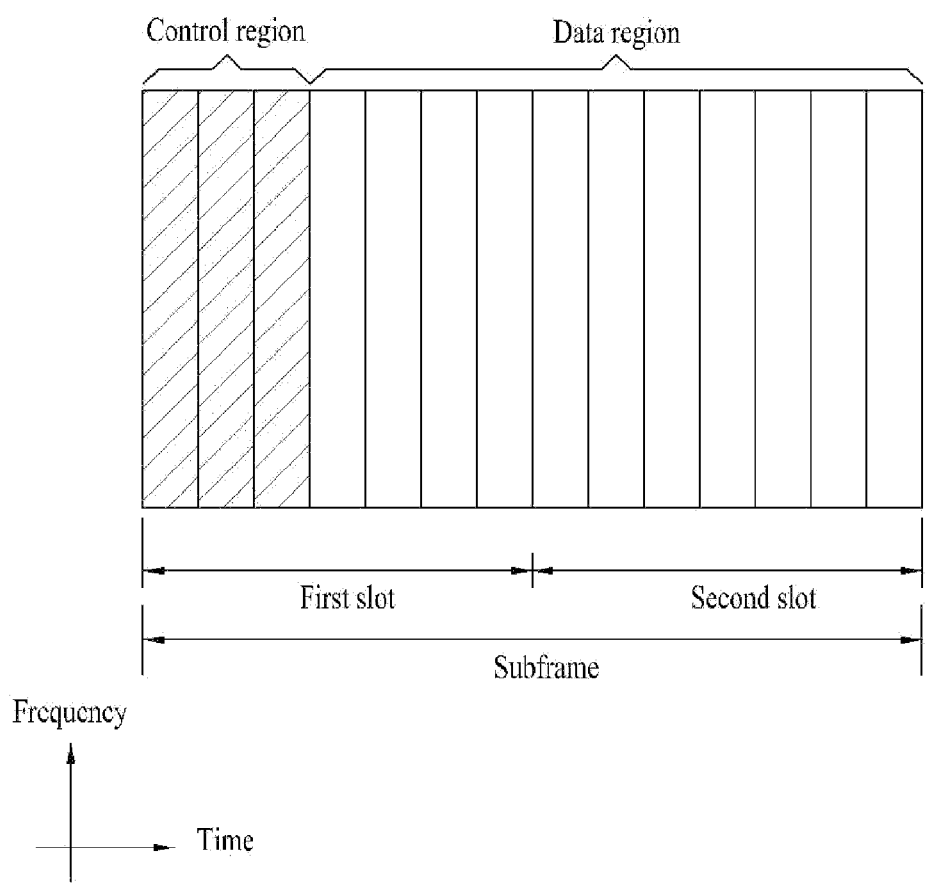
FIG. 3 illustrates the structure of a DL subframe used in a 3($3^{rd}$ Generation Partnership Project) LTE (Long Term Evolution)/LTE-A (Advanced) system.

FIG. 3 illustrates the structure of a DL subframe used in a 3GPP LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. For example, the DCI includes transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual UEs within a UE group, Tx power control information, and activity information of voice over Internet protocol (VoIP). The size and usage of the DCI carried by one PDCCH are varied depending on DCI formats. The size of the DCI may be varied depending on a coding rate. In the current 3GPP LTE system, various formats are defined, wherein format 0 is defined for a UL, and formats 1, 1A, 1B, 1C, 1D, 2, 2A, 3, and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

Table 3 illustrates an example of the DCI format.

TABLE 3

| DCI format | Description |
| --- | --- |
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact resource assignments for PDSCH using rank-1 closed loop precoding |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 3/3A | Power control commands for PUCCH and PUSCH with 2-bit/1-bit power adjustments |
| 4 | Scheduling of PUSCH in one UL Component Carrier with multi-antenna port transmission mode |

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to 9 REGs and one REG corresponds to 4 REs. In a 3GPP LTE system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Figure 4:
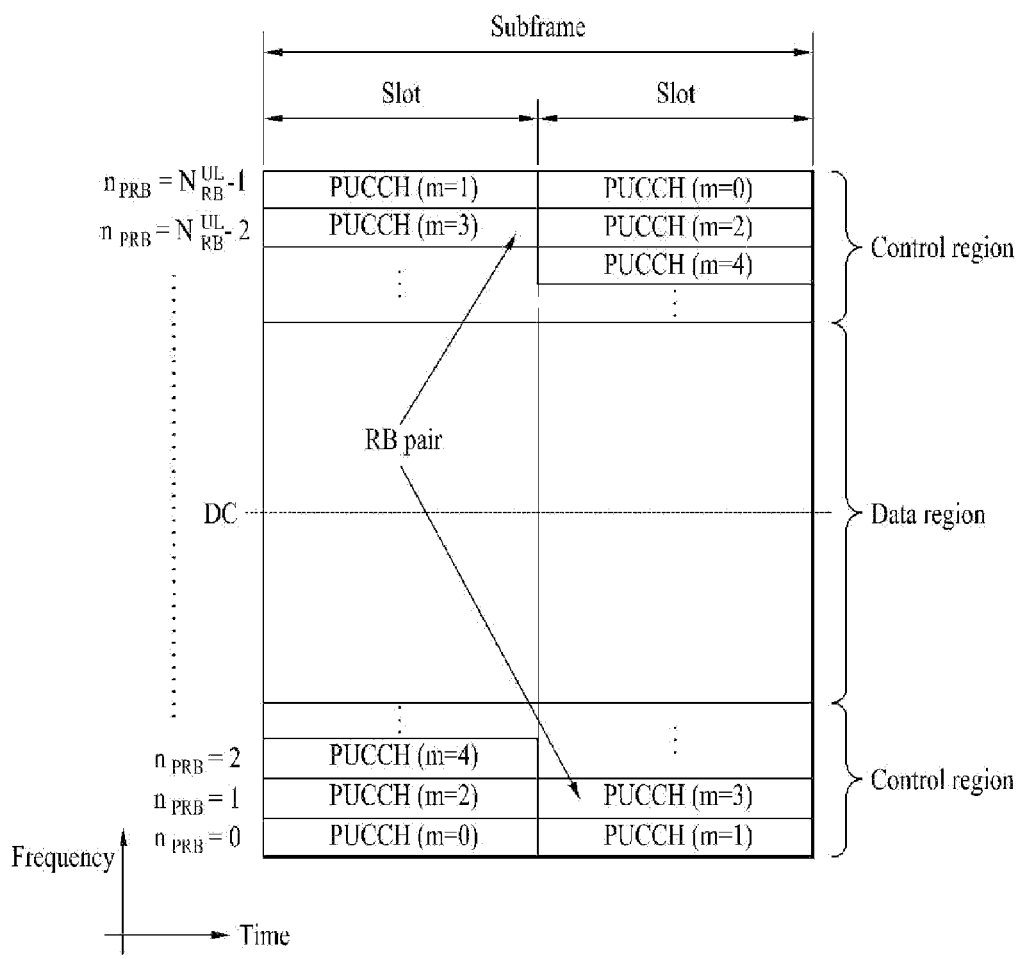
FIG. 4 illustrates the structure of a UL subframe used in a 3GPP LTE/LTE-A system.

FIG. 4 illustrates the structure of a UL subframe used in a 3GPP LTE/LTE-A system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to deliver user data.

In the UL subframe, subcarriers distant from a direct current (DC) subcarrier are used as the control region. In other words, subcarriers located at both ends of a UL transmission bandwidth are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. MIMO-related feedback information includes a rank indicator (RI) and a precoding matrix indicator (PMI).

Figure 5:
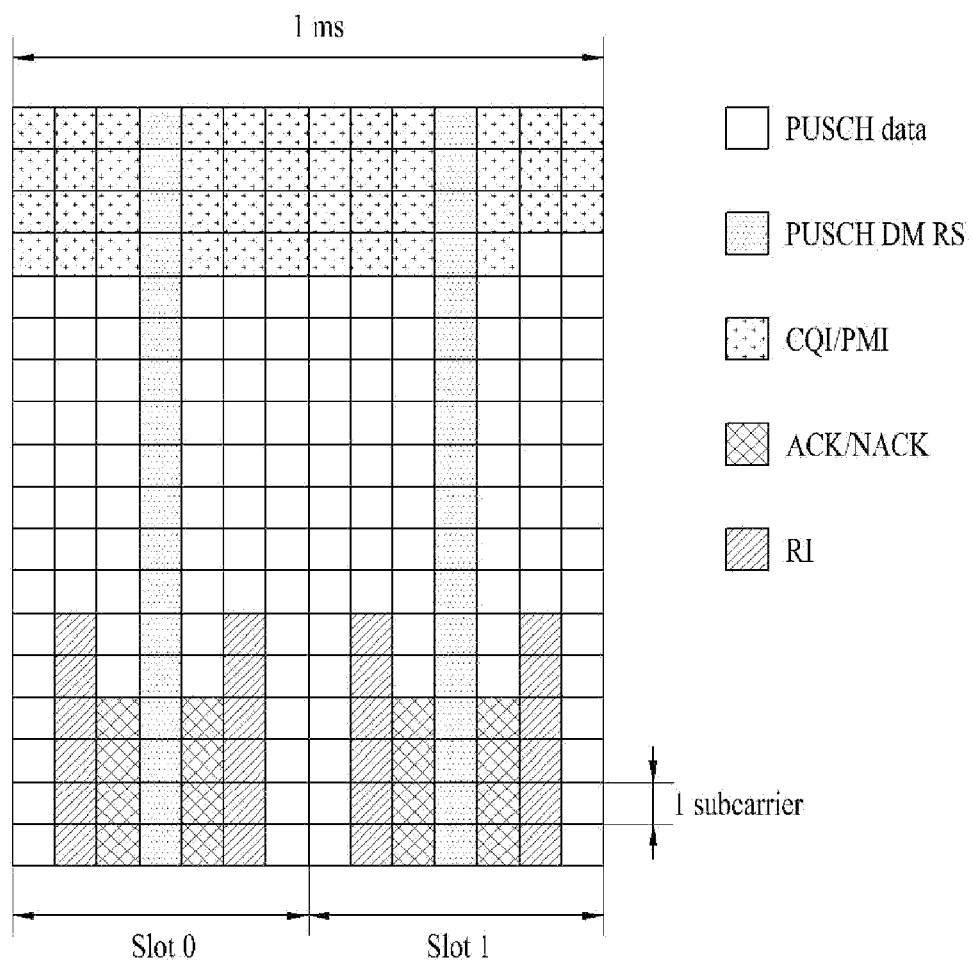
FIG. 5 illustrates multiplexing of uplink control information (UCI), UL data, and demodulation reference signals (DM RSs) in a physical uplink shared channel (PUSCH) region.

FIG. 5 illustrates multiplexing of UCI, UL data, and DM RSs in a PUSCH region.

In order for an eNB to demodulate a UL data signal received through a UL channel (e.g. a PUCCH or PUSCH), an RS to be compared with the data signal is needed. The RS refers to a signal of a predefined special waveform, transmitted from the eNB to a UE or from the UE to the eNB and known to both the eNB and the UE. The RS is also called a pilot. Hereinbelow, an RS for demodulating a UL signal (e.g. UCI) transmitted through a PUCCH will be referred to as a PUCCH DM RS and an RS for demodulating a UL signal (e.g. UL data) transmitted through a PUSCH will be referred to as a PUSCH DM RS. The PUCCH DM RS is transmitted in a PUCCH region for demodulation of UCI transmitted through the PUCCH in the PUCCH region. The PUSCH DM RS is transmitted in a PUSCH region as illustrated in FIG. 5 for demodulation of UCI and/or data transmitted through the PUSCH.

Referring to FIG. 5, CQI and/or PMI (CQI/PMI) resources are located at the start part of PUSCH data resources. The CQI/PMI resources are sequentially mapped to all SC-FDMA symbols on one subcarrier and then are mapped on the next subcarrier. The CQI/PMI resources are mapped starting from left to right, that is, in the direction of ascending SC-FDMA symbol index, within a subcarrier. The PUSCH data is rate-matched in consideration of the amount of the CQI/PMI resources (i.e. the number of coded symbols). A modulation order which is the same as the modulation order of UL-SCH data is used for CQI/PMI. ACK/NACK is inserted through puncturing part of SC-FDMA resources to which UL-SCH data is mapped. ACK/NACK is located besides a PUSCH RS which is an RS used to demodulate the PUSCH data and is filled starting bottom to top, that is, in the direction of ascending subcarrier index, within an SC-FDMA symbol. In the case of a normal CP, SC-FDMA symbols for ACK/NACK are located at SC-FDMA symbols #2/#5 in each slot as illustrated in FIG. 5. Irrespective of whether ACK/NACK is actually transmitted in a subframe, a coded RI is located next to the symbol for ACK/NACK. In 3GPP LTE, UCI may be scheduled to be transmitted on a PUSCH without PUSCH data. ACK/NACK, RI, and CQI/PMI may be multiplexed in a similar way to multiplexing as illustrated in FIG. 5. Channel coding and rate matching for control signaling without the PUSCH data are identical to channel coding and rate matching for control signaling with the PUSCH data.

The UL UE-specific RS is defined by a cyclic shift of a base sequence according to a predetermined rule. For example, an RS sequence $r^{(\alpha)}_{u,v}(n)$ is defined by a cyclic shift $\alpha$ of a base sequence $r_{u,v}(n)$.

$$r_{u,v}^{(\alpha)}(n) = e^{j\alpha n} \cdot r_{u,v}(n), 0 \leq n < M_{sc}^{RS} \quad \text{[Equation 1]}$$

In Equation 1, $M_{sc}^{RS} = m \cdot N_{sc}^{RB}$ is the length of the reference signal sequence and $1 \leq m \leq N_{RB}^{max,UL}$. $N_{RB}^{max,UL}$ is the largest UL bandwidth configuration, expressed in multiples of $N_{sc}^{RB}$. Multiple reference signal sequences may be defined from a single base sequence through different values of $\alpha$. For a DM RS and an SRS, a plurality of base sequences is defined. For example, base sequences may be defined using a root Zadoff-Chu sequence. Base sequences $r_{u,v}(n)$ are divided into groups. Each base sequence group contains one or more base sequences. For example, each base sequence group may contain one base sequence (v=0) of each length $M_{sc}^{RS} = m \cdot N_{sc}^{RB}$ (1≤m≤5) and two base sequences of each length $M^{RS}_{sc}=m\cdot N^{RB}_{sc}$ ($6\leq m\leq N^{RB}_{sc}$). In $r_{u,v}(n)$, $u\in\{0, 1, \ldots, 29\}$ is the group number (i.e. group index), v is the base sequence number within the group (i.e. base sequence index). The sequence group number u and the number v within the group may vary in time.

The sequence-group number u in slot $n_s$ is defined by a group hopping pattern $f_{gh}(n_s)$ and a sequence-shift pattern $f_{ss}$ according to the following equation.

$$u=(f_{gh}(n_s)+f_{ss})\bmod 30 \qquad \text{[Equation 2]}$$

There are plural different (e.g. 17) hopping patterns and plural different (e.g. 30) sequence shift patterns. Sequence-group hopping can be enabled or disabled by a cell-specific parameter provided by higher layers.

The group-hopping pattern $f_{gh}(n_s)$ may be given for PUSCH and PUCCH by the following equation.

$$f_{gh}(n_s)= \begin{cases} 0 & \text{if group hopping is disabled} \\ \left(\sum_{i=0}^{7}c(8n_s+i)\cdot 2^i\right)\bmod 30 & \text{if group hopping is enabled} \end{cases} \qquad \text{[Equation 3]}$$

In Equation 3, the pseudo-random sequence c(i) may be defined by a length-31 Gold sequence. The output sequence c(n) of length $M_{PN}$, where $n=0, 1, \ldots, M_{PN}-1$, is defined by the following equation.

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \qquad \text{[Equation 4]}$$

In Equation 4, $N_C=1600$ and the first m-sequence is initialized with $x_1(0)=1$, $x_1(n)=0$, $n=1, 2, \ldots, 30$. The initialization of the second m-sequence is denoted by the following equation with a value depending on the application of the sequence.

$$c_{init}=\sum_{i=0}^{30}x_2(i)\cdot 2^i \qquad \text{[Equation 5]}$$

For Equation 3, The pseudo-random sequence generator is initialized with $c_{init}$ according to the following equation at the beginning of each radio frame.

$$c_{init}=\left\lfloor\frac{N^{cell}_{ID}}{30}\right\rfloor \qquad \text{[Equation 6]}$$

In Equation 6, $N^{cell}_{ID}$ is a physical layer cell ID.

According to the current 3GPP LTE(-A) standards, the group-hopping pattern is the same for PUSCH and PUCCH according to Equation 3, but the sequence-shift pattern differs between PUCCH and PUSCH. For PUCCH, the sequence-shift pattern $f^{PUCCH}_{ss}$ is given by the following equation based on the cell ID.

$$f^{PUCCH}_{ss}=N^{cell}_{ID}\bmod 30 \qquad \text{[Equation 7]}$$

A sequence shift pattern for a PUSCH $f^{PUSCH}_{ss}$ is given by the following equation using a sequence shift pattern $f^{PUCCH}_{ss}$ for a PUCCH and a value ($\Delta_{ss}$) configured by higher layers.

$$f^{PUSCH}_{ss}=(f^{PUCCH}_{ss}+\Delta_{ss})\bmod 30 \qquad \text{[Equation 8]}$$

In Equation 8, $\Delta_{ss}\in\{0, 1, \ldots, 29\}$.

Base sequence hopping only applies for RSs of length $M^{RS}_{sc}\geq 6N^{RB}_{sc}$. For RSs of length $M^{RS}_{sc}<6N^{RB}_{sc}$, the base sequence number v within the base sequence group is given by v=0. For RSs of length $M^{RS}_{sc}\geq 6N^{RB}_{sc}$, the base sequence number v within the base sequence group in slot $n_s$ is defined by $v=c(n_s)$ if group hopping is disabled and sequence hopping is enabled, otherwise defined by v=0, where the pseudo-random sequence c(i) is given by Equation 4. The pseudo-random sequence generator is initialized with $c_{init}$ according to the following equation at the beginning of each radio frame.

$$c_{init}=\left\lfloor\frac{N^{cell}_{ID}}{30}\right\rfloor\cdot 2^5+f^{PUSCH}_{ss} \qquad \text{[Equation 9]}$$

An RS for demodulating a UL signal carried on a PUSCH (hereinafter, a PUSCH DM RS) is transmitted on a layer basis. A PUSCH DM RS sequence $r^{(p)}PUSCH(\cdot)$ associated with a layer $\lambda\in\{0, 1, \ldots, v-1\}$ may be given by the following equation.

$$r_{PUSCH}^{(\lambda)}(m\cdot M^{RS}_{sc}+n)=w^{(\lambda)}(m)r_{u,v}^{(\alpha\_\lambda)}(n) \qquad \text{[Equation 10]}$$

In Equation 10, $m=0, 1$, $n=0, \ldots, M^{RS}_{sc}-1$, and $M^{RS}_{sc}=M^{PUSCH}_{sc}$. $M^{PUSCH}_{sc}$ is scheduled bandwidth for uplink transmission, expressed as a number of subcarriers.

The cyclic shift $\alpha\_\Delta$, in a slot $n_s$ is given as the following equation.

$$\alpha\_\lambda=2\pi n_{cs,\lambda}/12$$

$$n_{cs,\lambda}=(n^{(1)}_{DMRS}+n^{(2)}_{DMRS,\lambda}+n_{PN}(n_s))\bmod 12 \qquad \text{[Equation 11]}$$

In Equation 11, $n^{(1)}_{DMRS}$ is given by Table 4 according to cyclicShift provided by higher layers. Table 4 shows a mapping of cyclicShift given by higher layers to $n^{(1)}_{DMRS}$.

TABLE 4

| cyclicShift | $n^{(1)}$DMRS |
|---|---|
| 0 | 0 |
| 1 | 2 |
| 2 | 3 |
| 3 | 4 |
| 4 | 6 |
| 5 | 8 |
| 6 | 9 |
| 7 | 10 |

In Equation 10, the orthogonal sequence $w^{(\lambda)}(m)$ may be given by Table 5 using the cyclic shift field in most recent UL-related DCI for the transport block associated with the corresponding PUSCH transmission. Table 5 shows an example mapping of cyclic shift field in UL-related DCI format to $n^{(2)}$DMRS,$\lambda$ and $[w^{(\lambda)}(0)\ w^{(\lambda)}(1)]$.

TABLE 5

| Cyclic Shift Field in | $n^{(2)}$DMRS,$\lambda$ | | | | $[w^{(\lambda)}(0)\ w^{(\lambda)}(1)]$ | | | |
|---|---|---|---|---|---|---|---|---|
| uplink-related DCI format | $\lambda$ = 0 | $\lambda$ = 1 | $\lambda$ = 2 | $\lambda$ = 3 | $\lambda$ = 0 | $\lambda$ = 1 | $\lambda$ = 2 | $\lambda$ = 3 |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |

TABLE 5-continued

| Cyclic Shift Field in uplink-related DCI format | $n^{(2)}_{DMRS,\lambda}$ | | | | $[w^{(\lambda)}(0)\ w^{(\lambda)}(1)]$ | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

In Equation 11, $n_{PN}(n_s)$ is given by the following equation using the cell-specific pseudo-random sequence $c(i)$.

$$n_{PN}(n_s) = \sum_{i=0}^{7} c(8N_{symb}^{UL} \cdot n_s + i) \cdot 2^i \quad \text{[Equation 12]}$$

In Equation 12, the pseudo-random sequence $c(i)$ is defined by the length-31 Gold sequence according to Equation 4. The pseudo-random sequence generator is initialized with $c_{init}$ according to the following equation at the beginning of each radio frame.

$$c_{init} = \left\lfloor \frac{N_{ID}^{cell}}{30} \right\rfloor \cdot 2^5 + f_{ss}^{PUSCH} \quad \text{[Equation 13]}$$

In a communication system up to now, a UE connected to a specific cell receives a DL signal from an eNB of the specific cell and transmits a UL signal associated with the DL signal to the eNB on a PUSCH through the specific cell.

Figure 6:
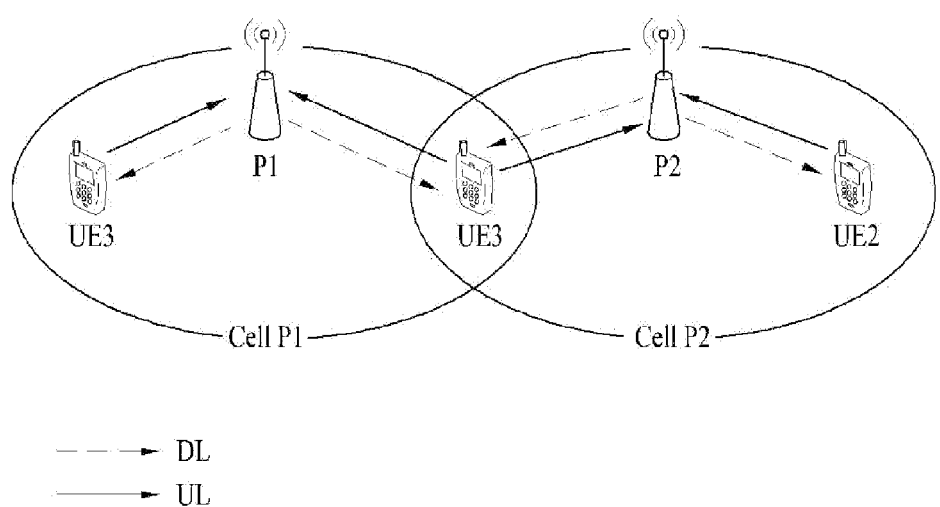
FIG. 6 illustrates coordinated multi-point transmission/reception (CoMP) in a homogeneous network.
Figure 7:
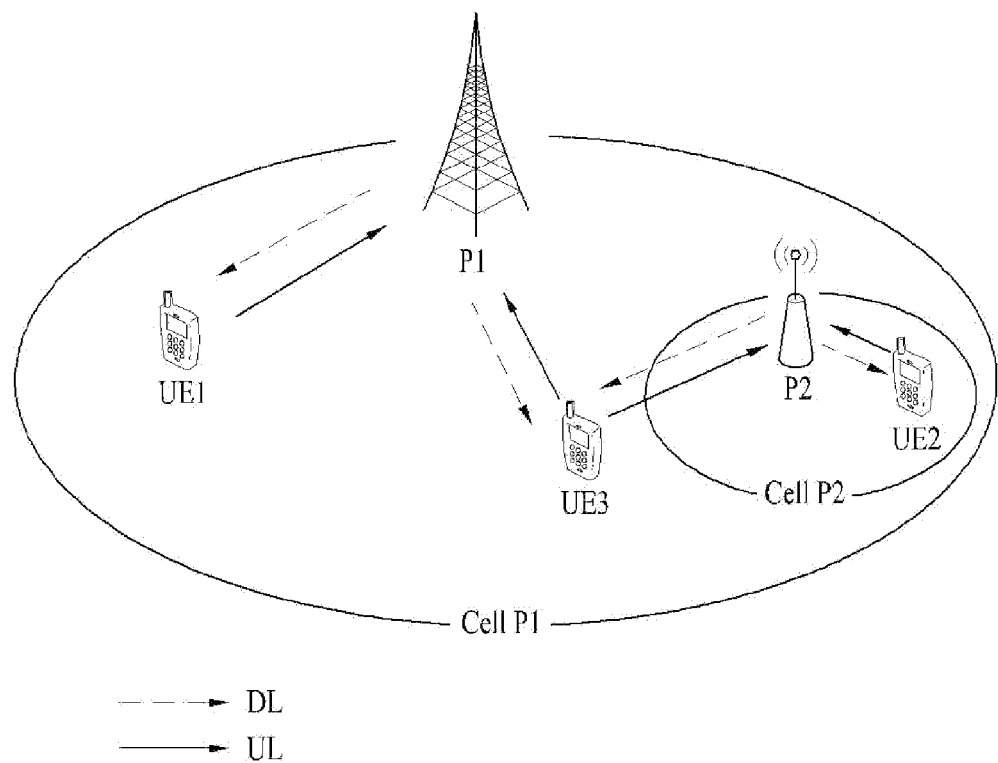
FIG. 7 illustrates CoMP in a heterogeneous network.

FIG. 6 illustrates CoMP in a homogeneous network and FIG. 7 illustrates CoMP in a heterogeneous network. Hereinafter, a UE supporting CoMP will be referred to as a CoMP UE and a UE that cannot support CoMP will be referred to as a legacy UE.

Referring to FIG. 6, in the present invention, a homogeneous network refers to a network consisting only of macro points (or macro cells) or a network consisting only of micro points (or micro cells). A macro cell means a cell having relatively wide service coverage, to which a communication service is provided by a point having a high transmit power. A normal eNB installed by a mobile communication network operator (hereinafter, a macro eNB) may be a point of the macro cell. In the present invention, a micro cell refers to a cell to which a communication service is provided by a point installed in a shadow area which is not covered by a point of a macro cell or refers to a cell having narrower service coverage than the macro cell. For example, a pico eNB, a femto eNB, a relay, an RRH, etc. may be points of a micro cell. A point of a micro cell is a small-scale version of a macro eNB and may independently operate while performing most of the functions of the macro eNB. The point of the micro cell has narrower coverage and lower transmit power than the macro eNB and accommodates fewer UEs than the macro eNB.

Referring to FIG. 7, in the present invention, a heterogeneous network refers to a network in which a macro point and a micro point (or a macro cell and a micro cell) coexist even though the same radio access technology (RAT) is used. For example, if a point P1 is composed of a macro eNB and a point P2 is composed of a micro eNB (e.g. a pico eNB), a heterogeneous network including a cell P1, which is a macro cell, and a cell P2, which is a micro cell, may be configured.

Hereinafter, an eNB of a macro cell will be referred to as an MeNB, an eNB of a micro cell will be referred to as a PeNB, a UE connected to the macro cell will be referred to as an MeUE, and a UE connected to a micro cell will be referred to as a PeUE.

Referring to FIGS. 6 and 7, UE1 receives a DL signal only from a point P1 at one transmission timing and transmits a UL signal only to the point P1 at one reception timing. UE2 receives a DL signal only from a point P2 at one reception timing and transmits a UL signal only to the point P2 at one transmission timing. In contrast, if UE3 supports CoMP and is configured to operate in CoMP, UE3 operating in CoMP may receive a DL signal at one reception timing from the points P1 and P2, which are different points included on one CoMP set, or from a point dynamically selected from among the multiple points. Moreover, UE3 operating in CoMP may simultaneously transmit a UL signal at one transmission timing to different multiple points included in the CoMP set or to a point which is dynamically selected from among the multiple points. Hereinafter, a UE supporting CoMP will be referred to as a CoMP UE and a UE which does not support CoMP will be referred to as a legacy UE.

If each UE belonging to one cell, like UE1 or UE2, receives a DL signal from one eNB at one reception timing and transmits a UL signal to the eNB at one transmission timing, since the eNB manages all scheduling of UEs belonging to the cell, the eNB may easily perform scheduling so as to guarantee orthogonality of UL signals of the UEs. Even if there is a UE configured for UL CoMP, which transmits a signal to a plurality of reception cells or reception points (RPs), it is desirable that UL signals (a PUSCH and a PUCCH) transmitted towards one RP be transmitted so as to guarantee orthogonality therebetween. Especially, a UE performing UL CoMP with respect to heterogeneous cells constituting the heterogeneous network as in FIG. 7 desirably generates and transmits UL signals so as to be received by points of the heterogeneous cells while maintaining orthogonality therebetween. Since a PUSCH DM RS has a significant effect on PUSCH demodulation performance, it is very important to guarantee orthogonality between PUSCH DM RSs transmitted to the same point. Generally, UL signals in the heterogeneous network generate stronger mutual interference than those in the homogeneous network. Accordingly, embodiments of the present invention will be described focusing upon the heterogeneous network consisting of a macro cell and a pico cell. However, if there is strong interference between UL signals, the embodiments of the present invention described below may be applied even to the homogeneous network.

Basically, an RS sequence differs according to a base sequence, a cyclic shift (CS) applied to the base sequence, an orthogonal cover code (OCC) (also called an orthogonal sequence) applied to a CS-applied sequence, and the like. Orthogonality or quasi-orthogonality between UL DM RS sequences is maintained by applying the CS to the base sequence or multiplying the OCC by the CS-applied sequence. In the case of a CoMP UE, since a cell in which the CoMP UE receives a DL signal (hereinafter, a DL serving cell) may be different from a cell in which the CoMP UE transmits a UL signal (hereinafter, a UL serving cell), a UL transmission signal needs to generate a DM RS sequence based on a cell ID different from a cell ID of the DL serving cell. That is, even though a CoMP UE generates a base sequence suitable for a point to which a PUSCH is to be transmitted (hereinafter, a target point), a CS and/or an OCC applied to the base sequence generated by the CoMP UE needs to be coordinated so as to maintain orthogonality with CSs and OCCs of other UEs (e.g. UE2 of FIG. 7) transmitting PUSCH DM RSs to the target point. For example, a method may be considered for applying different OCCs to PUSCH DM RS sequences while UEs simultaneously transmitting PUSCH DM RSs to the same point using the same CS hopping pattern. Referring to FIG. 7, if UE2 and UE3 apply orthogonal OCCs to respective PUSCH DM RSs while maintaining the same base sequence and the same CS hopping pattern, orthogonality between the PUSCH DM RS sequence of UE2 and the DM RS sequence of UE3 can be maintained.

A CS hopping (pattern) value is determined based on a higher layer signal (hereinafter, n1), a physical layer signal (hereinafter, n2), and a function output value (hereinafter, n3) of a pseudo random (PN) sequence generator. For instance, a CS value to be applied to a base sequence at one transmission timing may be configured by a function value of n1, n2, and n3 as follows.

$$CS\ value = f(n1,n2,n3) \quad \text{[Equation 14]}$$

For example, $\alpha\_\lambda$ of Equation 11 may be a "CS value" of Equation 14. $n^{(1)}{}_{DMRS}$ and $n^{(2)}{}_{DMRS,\lambda}$ of Equation 11 may be n1 and n2 of Equation 14, respectively. Equation 12 may correspond to a CS hopping pattern and $n_{PN}(n_s)$ may correspond to a CS hopping value n3 in a slot $n_s$. Alternatively, a part or all of Equation 13 may correspond to n3.

Referring to FIG. 7, assuming that UE3, which is a CoMP UE connected to a macro cell (hereinafter, a macro CoMP UE), performs UL transmission targeted at a cell P2 which is a pico cell, an eNB of a cell P1 (hereinafter, MeNB) may immediately perform scheduling coordination so that UL transmission of UE1 connected to the cell P1 does not collide with UL transmission of UE3, whereas it is difficult to perform scheduling coordination between UL transmission of UE3 and UL transmission of UE2 which is not connected to the cell P1. Accordingly, scheduling information between the MeNB and an eNB of the cell P2 (hereinafter, a PeNB) or information for guaranteeing orthogonality of DM RSs between a UE of the cell P1 and a UE of the cell P2 need to be exchanged. As an example, referring to FIG. 7, in order to maintain a CS hopping pattern of a macro CoMP UE, UE3, and a CS hopping pattern of a PeUE, UE2, scheduling coordination between the MeUE and the PeUE is needed. The MeNB and the PeNB may exchange or forward n1 and/or n2 and/or n3. However, since n2 which is a signal transmitted through a physical layer is a dynamic signal, a DM RS sequence of the CoMP UE and a DM RS sequence of the PeUE may be identical when coordination between cells is not performed. This is because a higher layer signal is a semi-static signal configured to be applied to a relatively long duration (e.g. plural subframes or plural frames) but the physical layer signal is a dynamic signal which is determined whenever necessary for a short time duration (e.g. one slot or one subframe) and transmitted to a UE. If the DM RS sequence of the CoMP UE is equal to the DM RS sequence of the PeUE, since DM RS sequences received by the PeNB from different UEs at one timing collide, it may be impossible to demodulate a PUSCH.

The PeNB may exchange sequences pre-categorized as a sequence to be used by the PeUE and a sequence not to be used by the PeUE with the MeNB. The MeNB may exchange sequences pre-categorized as a sequence to be used by the macro CoMP UE and a sequence not to be used by the macro CoMP UE with the PeNB. To determine sequences to be used or not to be used, an operation of exchange indispensable parameter(s) for generating the sequences is needed. Referring to FIGS. 6 and 7, as one method for performing scheduling coordination between UE3 and UE2, a CS hopping pattern generation related parameter(s) (e.g. base sequence generator input parameters (e.g. $c_{init}$: $N^{cell}{}_{ID}$, $\Delta_{ss}$) and CS hopping value generator parameter(s) (e.g. $c_{init}$: n1 and n3, or n1, n2, and n3)) may be exchanged through an X2 interface between eNBs, so that CS values of UEs belonging to different cells may be differently adjusted. Since input parameters of n1 and n3 are provided to a UE by a higher-layer signal (e.g. an RRC signal), eNBs may easily exchange input parameters with each other. However, it is difficult for eNBs to exchange n2 due to characteristics of a dynamic signal. Accordingly, a detailed method is needed for differently setting f(n1, n2, n3) of each of UEs that belong to different cells and transmit DM RSs to the same point even if all CS hopping pattern generation related parameters except for n2 are exchanged between eNBs.

The present invention proposes an embodiment for differentiating the range of n2 usable by a macro CoMP UE from the range of n2 usable by a PeUE. The available ranges of n2 become different so that the same DM RS sequence caused by the same input parameter in the same slot/subframe can be prevented from being generated.

Since combinations of all input parameters associated with a CS determine a final CS value, scheduling coordination needs to be performed such that the combinations of all input parameters are differently configured. Even if values of n2 are equal, if different CS values are obtained because other input parameters are different, orthogonality between a DM RS sequence of a macro CoMP UE and a DM RS sequence of a PeUE may be guaranteed. For example, if values of n1 are differently configured even though values of n2 are equal, a CS value of the macro CoMP UE and a CS value of the PeUE may be differently determined so as to guarantee orthogonality of a given level or more. However, since n2 is dynamically changed, the possibility of obtaining the same CS value cannot be excluded even if different values of n1 are provided to the macro CoMP UE and the PeUE. Accordingly, a value of n2 available in each UE or each cell is desirably restricted. The value of n2 available in each UE or each cell may be limited on a slot or subframe basis. For example, referring to FIG. 7 and Table 5, a part (e.g. 000, 001, and 010) among 8 values capable of being configured in a CS field in a UL-related DCI format may be configured to be used by UE3 and a part or all of the other values may be configured to be used by UE2. An eNB of the point P1 may configure one of the 8 values in the CS field in UL grant DCI to be transmitted to UE1 and configure a value of n2 of a limited range (e.g. one of 000, 001 and 010) in the CS field in UL grant DCI to be transmitted to UE3. When interference caused by UL transmission of UE1 and UL transmission of UE3 is weak, the same value of n2 may be allocated to UE1 and UE3.

The range of n2 to be used by a CoMP UE and the range of n2 to be used by a PeUE may be restricted in relation to a time resource (e.g. a slot index or a subframe index). By differently configuring a parameter (e.g. n2) capable of being used by the CoMP UE and the PeUE at a specific timing, the CoMP UE and the PeUE can be prevented from using the same RS sequence at a specific timing. As an example, an eNB may pre-inform a UE of a plurality of parameter sets and pre-designate or signal, to the UE, which parameter set among the plural parameter sets will be used over time so that the CoMP UE and the PeUE can be prevented from transmitting DM RS sequences which are not orthogonal. For example, the eNB may transmit information indicating a mapping relationship between parameter sets and time resources used by the parameter sets to the CoMP UE. Each parameter set may include one or more parameters (e.g. one or more values of n2) and the eNB may transmit one parameter in a parameter set associated with a time resource used for transmission of a DM RS sequence to the CoMP UE through a PDCCH.

In a legacy LTE system, a base sequence and a CS hopping pattern are generated by using a physical layer cell ID $N^{cell}_{ID}$ as a seed. A legacy UE acquires $N^{cell}_{ID}$ of a cell to which the legacy UE belongs based on a primary synchronization signal (PSS) and a secondary synchronization signal (SSS) of DL synchronization signals received from a serving cell and uses $N^{cell}_{ID}$ to generate an RS base sequence. Unlike a legacy communication system, since a CoMP UE may transmit a UL signal to one point dynamically selected from among points in a CoMP set or simultaneously transmit a UL signal to the points, a DM RS sequence should be generated in consideration of a plurality of RPs. An eNB may inform the CoMP UE of a seed used to generate a base sequence. Hereinafter, a parameter provided to a UE as a seed for generating the RS base sequence will be referred to as a virtual cell ID, to differentiate the parameter from the physical layer cell ID $N^{cell}_{ID}$. For instance, the eNB may provide two virtual cell IDs to the CoMP UE capable of performing UL transmission to one of two cells or to the two cells. If the CoMP UE is configured as JR mode, the CoMP UE may generate two DM RS sequences using the two virtual cell IDs and transmit the two DM RS sequences together with data. Meanwhile, if the CoMP UE is configured as DPS mode, the eNB may dynamically indicate information indicating one of the two virtual cell IDs to the CoMP UE and the CoMP UE may transmit a DM RS sequence generated using the indicated virtual cell ID together with data.

At least one of virtual cell IDs provided by an eNB to a CoMP UE is to generate an RS sequence detected by a PeNB. The eNB may identically configure a virtual cell ID used when the CoMP UE generates an RS sequence for transmission to a point of a PeNB from a cell ID used when the PeUE generates an RS sequence and transmit the virtual cell ID so that the CoMP UE uses the same base sequence as the PeUE. The eNB may differently configure the above IDs so that the CoMP UE uses a different base sequence from the PeUE.

The eNB may increase the number of base sequences so as to simultaneously maintain orthogonality between DM RS sequences of more UEs. To this end, the eNB may UE-specifically signal a plurality of virtual cell IDs so that UEs have unique (or partially overlapping) base sequences. The eNB may significantly increase the number of base sequences by differently configuring a part or all of input parameters required to generate the base sequences, in addition to cell IDs.

The above-described embodiment for differently configuring the range of n2 to be used by the CoMP UE and the range of n2 to be used by the PeUE may be applied even to the case in which a base sequence of a macro CoMP UE is different from a base sequence of a PeUE. When the macro CoMP UE and the PeUE use different base sequences, orthogonality between the DM RS sequence of the macro CoMP UE and the DM RS sequence of the PeUE can be guaranteed to a certain degree even though the same CS hopping pattern is used. However, even if base sequences are different, since it is difficult to guarantee orthogonality between DM RS sequences generated by the macro CoMP UE and the PeUE by applying the same CS value, the range of n2 usable by the macro CoMP UE needs to be distinguished from the range of n2 usable by the PeUE.

Meanwhile, not only n2 but also a higher layer signal may be configured in relation to a time resource. For example, an eNB may pre-signal an n1 set (n11, n12, n13, ..., n1K) to be applied over time to a UE. Values in the n1 set may vary with time. The eNB may dynamically transmit n2 to the UE so that a value of "n1i+n2" (where i=1, ..., K) value of a CoMP UE becomes different from a value of "n1i+n2" (where i=1, ..., K) of a PeUE at the same timing. In the present invention, since the higher layer signal n1 is information shared between eNBs, an eNB of the CoMP UE is aware of which n1 will be used by the PeUE at any timing. The eNB may inform the CoMP UE of n2 satisfying the condition that an "n1i+n2" value of the CoMP UE is different from an "n1i+n2" value of the PeUE, among values of n2 usable by the CoMP UE at a corresponding timing.

Meanwhile, if the range of values of n1 is narrow, resources of n1 exclusively usable by the CoMP UE and the PeUE may be insufficient. Hence, a method may be used in which a UE properly hops values of n1 and, instead, collision between sequences at some timings is not excluded. That is, by differently hopping the values of n1 with respect to respective UEs, the number of UEs that are to perform UL transmission at one timing may be increased by the number of values of n1 or more while orthogonality between DM RS sequences transmitted to the same point by different UEs is guaranteed at a proper level. Alternatively, the eNB may cause UEs to use the same parameter and dynamically signal a different offset of the same parameter according to the UEs, thereby avoiding collision between DM RS sequences. The offset may be an arbitrary offset. Alternatively, in order to avoid and reduce resource collision, the range of the offset may be differently configured by combination with a resource index according to time, a resource index according to frequency, or a resource index according to space.

In the above-described embodiment, in order to maintain orthogonality between an RS sequence of a CoMP UE and an RS sequence of another UE having a target point as a serving point while dynamically signaling n2, the range of n2 usable by the CoMP UE is differently configured from that usable by the other UE at one UL transmission timing. An eNB may dynamically signal one value selected from among all available values of n2 to a normal UE operating in normal mode rather than CoMP mode or to a legacy UE that does not support CoMP and dynamically signal one of values of n2 in a subset of n2 configured to distinguish from a subset of n2 usable by another UE of a neighboring cell to a CoMP UE configured in CoMP mode.

It is not easy to maintain orthogonality between an RS sequence of a CoMP UE and an RS sequence of a normal UE while keeping n2 a dynamic signal. Considering this fact, the present invention proposes another embodiment in which all parameters determining a CS value are provided to the UE using a higher layer signal and are semi-statically changed. According to this embodiment, input parameters (initial values) of n1, n2 and n3 for example are provided to the UE through higher layer signaling. n1, n2 and n3 may be UE-specifically configured. Alternatively, a part of the input parameters of n1, n2, and n3 may be UE-specifically configured and the other part may be cell-specifically configured. An initial parameter of n3 in a CS hopping pattern may be cell-specifically configured and an initial parameter(s) of n1 and/or n2 may be UE-specifically configured according to the above-described embodiment of the present invention. In a legacy LTE system, n2 is signaled to the CoMP UE in association with an OCC. However, in CoMP to which the present invention is applied, n2 and the OCC may be separately signaled to the CoMP UE. Alternatively, n1 and n2 may be configured by one signal n4 and a separately configured OCC may be signaled to the CoMP UE or the signal n4 and the OCC may be configured as one signal in association with each other.

Meanwhile, as described in Equation 1, a plurality of base sequences defined for UL RS transmission is divided into one or more base sequence groups. A base sequence group may include one or more base sequences according to the length or bandwidth of the base sequence group. For example, in the case of a DM RS of 6 RBs or more, one group may include two base sequences. In this case, a method for indicating which sequence of which group will be used to the CoMP UE is needed. An eNB may indicate a base sequence group u to be used by the CoMP UE and a base sequence v in the base sequence group to the CoMP UE through higher layer signaling (e.g. medium access control (MAC) signaling or radio resource control (RRC) signaling). To reduce signaling overhead, a base sequence number v may be fixed to a specific value only for the CoMP UE or a UE commanded to perform CoMP. For example, the CoMP UE may be configured to always use v=0. Alternatively, the v value may be determined in relation to a subframe or a slot. The v value may be transmitted through physical layer signaling as in n2 or n4 or may be automatically determined in association with n2 and n4 so as to be achieved without using higher layer signaling. For example, a specific value of n2 may be defined as a specific v value. The v value may be determined by a CS value of n1 or a value of n1. For instance, the eNB may pre-designate the specific v value as a specific CS or the value of n1. This association may be hopped with a specific pattern over time.

Figure 8:
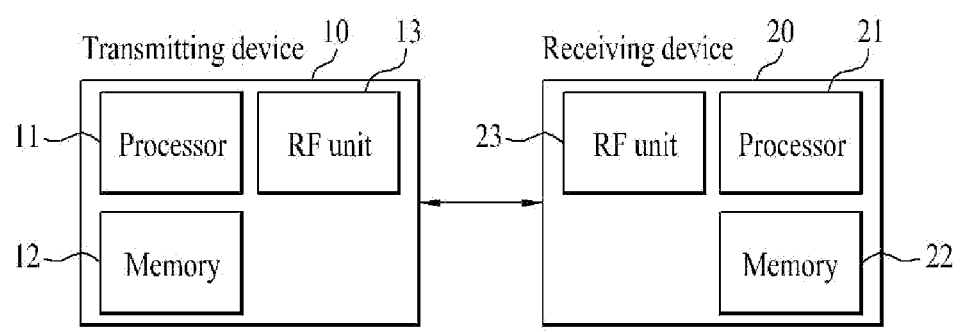
FIG. 8 is a block diagram illustrating elements of a transmitting device 10 and a receiving device 20 for implementing the present invention.

FIG. 8 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of it represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, the processor, RF unit, and memory included in the UE will be referred to as a UE processor, a UE RF unit, and a UE memory, respectively, and the processor, RF unit, and memory unit included in the eNB will be referred to as an eNB processor, an eNB RF unit, and an eNB memory, respectively.

According to the embodiments of the present invention, the eNB processor generates a PDCCH and/or a PDSCH, controls the eNB RF unit to transmit the generated PDCCH and/or PDSCH and the UE processor controls the UE RF unit to receive the PDCCH and/or PDSCH. According to the embodiments of the present invention, the UE processor generates a PUCCH, a PUSCH, a PUCCH DM RS, and/or a PUSCH DM RS, controls the UE RF unit to transmit the generated PUCCH, PUSCH, PUCCH DM RS, and/or PUSCH DM RS and the eNB processor controls the eNB RF unit to receive the PUCCH, the PUSCH, the PUCCH DM RS, PUSCH DM RS and/or an SRS. In the present invention, each reception/transmission point includes at least an RF unit.

The eNB processor according to an embodiment of the present invention may exchange information about a DM RS sequence which is to be used or not to be used by each cell or each point with another eNB processor of a point included in a CoMP set. The eNB processor can prevent use of the same DM RS sequence with another eNB processor in the same time resource by exchanging parameter(s) necessary for generating a DM RS sequence which is to be used or not to be used. The eNB processor may configure the range of n2 usable by the UE among all available values of n2 not to overlap with the range of n2 to be used by another eNB in the same time resource. The eNB processor may control the eNB RF unit to transmit information indicating the values of n2 usable by the UE to the UE. The eNB processor may control the eNB RF unit to transmit a UL grant to the UE through the PDCCH. The eNB processor may configure a different range of n2 to be used by the UE according to a time resource (e.g. a slot index or a subframe index). In this case, the eNB processor may configure the range of n2 for the UE so as not to overlap with the range of n2 to be used by another eNB processor in the same CoMP set in the same time resource. The eNB processor may configure a plurality of parameter sets and control the eNB RF unit to transmit information about the plural parameter sets to the UE. The eNB processor may control the eNB RF unit to pre-designate which parameter set will be used among the plural parameter sets over time or to transmit information about the parameter set to be used to the UE.

The UE RF unit may receive information indicating values of n2 allocated to the UE among all available values of n2 and transmit the information to the UE processor. In addition, the UE processor may receive a PDCCH signal and transmit the PDCCH signal to the UE processor. The UE may detect the PDCCH by monitoring a PDCCH search space in a DL subframe and detect the UL grant transmitted through the PDCCH. The PDCCH may include information indicating one value among the values of n2 usable by the UE. If the eNB processor configures a plurality of parameter sets, the eNB processor may control the eNB RF unit to transmit one n2 value among the values of n2 in a parameter set pre-designated or used according to time through the PDCCH. The UE processor may generate a DM RS sequence using n2 and control the UE RF unit to transmit the DM RS sequence together with UL data according to the UL grant. If the UE processor receives the plural parameter sets, the UE processor may use an actual value of n2 corresponding to control information received through the PDCCH among values associated to a corresponding slot or subframe to be used to generate the DM RS sequence. The UE processor may generate the DM RS sequence using n1 received through higher layer signaling, the one value of n2, and n3 received by higher layer signaling or determined in relation to a transmission timing of an RS and control the UE RF signal to transmit the DM RS sequence together with the UL data. For example, the UE processor may generate a PUSCH DM RS according to Equation 10 to Equation 12.

The eNB processor may provide a plurality of virtual cell IDs to the UE. The eNB may configure the UE to operate in CoMP. The UE processor configured for CoMP may generate one PUSCH DM RS sequence using one of the plural virtual cell IDs and control the UE RF unit to transmit the PUSCH DM RS sequent together with UL data. Alternatively, the UE processor may generate a plurality of DM RS sequences using the plural virtual IDs and control the UE RF unit to transmit the DM RS sequences together with data.

Meanwhile, the eNB processor may configure higher layer signal, as well as n2, in association with a time resource. For example, the eNB processor may pre-signal an n1 set (n11, n12, n13, ..., n1K) to be applied over time to the UE. In this case, a different value in the n1 set may be used to generate the DM RS over time. The eNB processor may allocate n2 so that an "n1i+n2" (where i=1, ..., K) value of the UE becomes different from an "n1i+n2" (where i=1, ..., K) value of another UE connected to another eNB processor in the same time resource. The eNB processor may control the eNB RF unit to transmit the allocated n2 to the UE through the PDCCH.

The eNB processor may control the eNB RF unit to transmit all parameters for determining a CS value using a higher layer signal to the UE. In this case, the UE processor may be configured to detect the all parameters for determining a CS value from the higher layer signal.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an eNB, a relay, a UE, or other devices in a wireless communication system.

The invention claimed is:

1. A method for receiving an uplink signal by a base station, the method comprising:
  transmitting, by the base station through higher layer signaling, a first cyclic shift parameter indicating one first cyclic shift value of predefined first cyclic shift values;
  transmitting, by the base station through the higher layer signaling, a second cyclic shift parameter indicating a set of second cyclic shift values usable by a user equipment among predefined second cyclic shift values;
  transmitting, by the base station through the higher layer signaling, a third cyclic shift parameter associated with an initial value of a pseudo-random sequence;
  transmitting, by the base station, control information for uplink data to the user equipment through a physical control channel; and
  receiving, by the base station, the uplink data according to the control information and a reference signal for demodulation of the uplink data,
  wherein the control information includes information indicating one second cyclic shift value among the set of second cyclic shift values, and
  wherein the reference signal is received using a cyclic shift hopping value determined based on the one first cyclic shift value, the one second cyclic shift value and the pseudo-random sequence.

2. The method according to claim 1, wherein the information indicating the set of second cyclic shift values includes information indicating a plurality of parameter sets, each set including one or more second cyclic shift values among the predefined second cyclic shift values.

3. The method according to claim 2, wherein the plural parameter sets are used in different time resources.

4. The method according to claim 3, wherein the one second cyclic shift value is included in a parameter set corresponding to a time resource in which the reference signal is received among the plural parameter sets.

5. The method according to claim 2, further comprising
transmitting, by the base station, information indicating a mapping relationship between the plural parameter sets and the time resources to the user equipment.

6. The method according to claim 1, wherein the set of second cyclic shift values are differently configured from second cyclic shift values used by a neighboring base station in the same time resource.

7. A base station for receiving an uplink signal, the base station comprising:
a radio frequency (RF) unit configured to transmit/receive a signal; and
a processor configured to control the RF unit to:
transmit, through higher layer signaling, a first cyclic shift parameter indicating one first cyclic shift value of predefined first cyclic shift values,
transmit, through the higher layer signaling, a second cyclic shift parameter indicating a set of second cyclic shift values usable by a user equipment among predefined second cyclic shift values,
transmit, through the higher layer signaling, a third cyclic shift parameter associated with an initial value of a pseudo-random sequence,
transmit control information for uplink data to the user equipment through a physical control channel, and
receive the uplink data according to the control information and a reference signal for demodulation of the uplink data,
wherein the control information includes information indicating one second cyclic shift value among the set of second cyclic shift values, and
wherein the reference signal is received using a cyclic shift hopping value determined based on the one first cyclic shift value, the one second cyclic shift value and the pseudo-random sequence.

8. A method for transmitting an uplink signal by a user equipment, the method comprising:
receiving, by the user equipment through higher layer signaling, a first cyclic shift parameter indicating one first cyclic shift value among predefined first cyclic shift values;
receiving, by the user equipment through the higher layer signaling, a second cyclic shift parameter indicating a set of second cyclic shift values usable by the user equipment among predefined second cyclic shift values;
receiving, by the user equipment through the higher layer signaling, a third cyclic shift parameter associated with an initial value of a pseudo-random sequence;
receiving, by the user equipment, control information for uplink data through a physical control channel; and
transmitting, by the user equipment, the uplink data and a reference signal for demodulation of the uplink data,
wherein the control information includes information indicating one second cyclic shift value among the set of second cyclic shift values, and
wherein the reference signal is generated using a cyclic shift hopping value determined based on the one first cyclic shift value, the one second cyclic shift value and the pseudo-random sequence.

9. The method according to claim 8, wherein the second cyclic shift parameter includes information indicating a plurality of parameter sets, each set including one or more second cyclic shift values among the predefined second cyclic shift values.

10. The method according to claim 9, wherein the plural parameter sets are used in different time resources.

11. The method according to claim 10, wherein the one second cyclic shift value is included in a parameter set corresponding to a time resource in which the reference signal is received among the plural parameter sets.

12. The method according to claim 10, further comprising
receiving information indicating a mapping relationship between the plural parameter sets and the time resources.

13. A user equipment for transmitting an uplink signal, the user equipment comprising:
a radio frequency (RF) unit configured to transmit/receive a signal; and
a processor configured to control the RF unit to:
receive, through higher layer signaling, a first cyclic shift parameter indicating one first cyclic shift value among predefined first cyclic shift values,
receive, through the higher layer signaling, information a second cyclic shift parameter indicating a set of second cyclic shift values usable by the user equipment among predefined second cyclic shift values,
receive, through the higher layer signaling, a third cyclic shift parameter associated with an initial value of a pseudo-random sequence,
receive control information for uplink data through a physical control channel, and
transmit the uplink data according to the control information and a reference signal for demodulation of the uplink data,
wherein the control information includes information indicating one second cyclic shift value among the set of second cyclic shift values, and
wherein the reference signal is generated using a cyclic shift hopping value determined based on the one first cyclic shift value, the one second cyclic shift value and the pseudo-random sequence.

14. The user equipment according to claim 13, wherein the second cyclic shift parameter includes information indicating a plurality of parameter sets, each set including one or more second cyclic shift values among the predefined second cyclic shift values.

15. The user equipment according to claim 14, wherein the plural parameter sets are used in different time resources.

16. The user equipment according to claim 15, wherein the one second cyclic shift value is included in a parameter set corresponding to a time resource in which the reference signal is received among the plural parameter sets.

17. The user equipment according to claim 15, wherein the processor is configured to control the RF unit to receive information indicating a mapping relationship between the plural parameter sets and the time resources.

* * * * *